United States Patent
Vaidya et al.

(10) Patent No.: US 12,468,616 B2
(45) Date of Patent: Nov. 11, 2025

(54) GENERATING POWER EFFICIENT SECURE MULTICLIENT PERFORMANCE MONITORING DATA

(71) Applicant: NVIDIA CORPORATION, Santa Clara, CA (US)

(72) Inventors: Pranav Vaidya, San Jose, CA (US); Alan Menezes, San Jose, CA (US); Siddharth Sharma, San Jose, CA (US); Jin Ouyang, Cupertino, CA (US); Gregory Paul Smith, Leander, TX (US); Timothy J. McDonald, Austin, TX (US); Shounak Kamalapurkar, Santa Clara, CA (US); Abhijat Ranade, Austin, TX (US); Thomas Melvin Ogletree, Lakeway, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 639 days.

(21) Appl. No.: 17/698,668

(22) Filed: Mar. 18, 2022

(65) Prior Publication Data
US 2023/0297485 A1    Sep. 21, 2023

(51) Int. Cl.
G06F 11/34    (2006.01)
G06F 1/10     (2006.01)
G06F 21/60    (2013.01)

(52) U.S. Cl.
CPC ............ G06F 11/3409 (2013.01); G06F 1/10 (2013.01); G06F 21/602 (2013.01)

(58) Field of Classification Search
CPC ...... G06F 11/3409; G06F 1/10; G06F 21/602; G06F 11/3065; G06F 11/3089
See application file for complete search history.

(56) References Cited

U.S. PATENT DOCUMENTS

| | | | |
|---|---|---|---|
| 8,001,531 B1 * | 8/2011 | Rideout | G06F 11/3698 717/124 |
| 2007/0169055 A1 * | 7/2007 | Greifeneder | G06F 11/3476 717/130 |
| 2013/0305012 A1 * | 11/2013 | Hopley | G06F 11/3648 712/32 |

(Continued)

*Primary Examiner* — Dong U Kim
(74) *Attorney, Agent, or Firm* — Squire Patton Boggs LLP; Sarah Mirza

(57) ABSTRACT

Various embodiments include a system for generating performance monitoring data in a computing system. The system includes a unit level counter with a set of counters, where each counter increments during each clock cycle in which a corresponding electronic signal is at a first state, such as a high or low logic level state. Periodically, the unit level counter transmits the counter values to a corresponding counter collection unit. The counter collection unit includes a set of counters that aggregates the values of the counters in multiple unit level counters. Based on certain trigger conditions, the counter collection unit transmits records to a reduction channel. The reduction channel includes a set of counters that aggregates the values of the counters in multiple counter collection units. Each virtual machine executing on the system can access a different corresponding reduction channel, providing secure performance metric data for each virtual machine.

20 Claims, 5 Drawing Sheets

(56) References Cited

U.S. PATENT DOCUMENTS

| | | | |
|---|---|---|---|
| 2014/0232455 A1* | 8/2014 | Teh | H02M 3/1588 |
| | | | 327/541 |
| 2015/0036783 A1* | 2/2015 | Chen | G01R 31/318552 |
| | | | 377/19 |
| 2019/0118099 A1* | 4/2019 | Payzer | H04L 65/4015 |
| 2019/0286971 A1* | 9/2019 | Che | G06F 11/3024 |
| 2019/0303263 A1* | 10/2019 | Fleming, Jr. | G06F 11/3024 |
| 2021/0073042 A1* | 3/2021 | Duluk, Jr. | G06F 11/3495 |
| 2021/0089340 A1* | 3/2021 | Chatterjee | H04L 63/0428 |
| 2022/0303483 A1* | 9/2022 | Elsayed | H04N 25/78 |

\* cited by examiner

GENERATING POWER EFFICIENT SECURE MULTICLIENT PERFORMANCE MONITORING DATA

GOVERNMENT LICENSE RIGHTS

This invention was made with Government support under DOE Contract No. DE-AC52-07NA27344 and Lawrence Livermore National Laboratory Subcontract No. B620719. The Government has certain rights in this invention.

BACKGROUND

Field of the Various Embodiments

Various embodiments relate generally to compute architectures and, more specifically, to generating power efficient secure multiclient performance monitoring data.

Description of the Related Art

A computing system, also referred to as a server, generally includes, among other things, one or more processing units, such as central processing units (CPUs) and/or graphics processing units (GPUs), and one or more memory systems. Processing units execute user mode software applications, which submit and launch compute tasks, executing on one or more compute engines included in the processing units. Data centers can deploy large fleets of such computing systems, where each computing system can execute multiple virtual machines for multiple clients of the data center. A hypervisor executing on a CPU of the computing system performs various techniques for partitioning the GPU on behalf of an administrative user of the data center. A guest user is assigned to a partition and can then perform processing tasks on one or more virtual machines within that partition in isolation from any other guest users assigned to any other partitions. The computing system is thereby able to securely execute software applications for multiple clients without risk of leaking data from one virtual machine to another virtual machine.

Both the administrative user of the data center and the guest users of the various virtual machines oftentimes desire to gather performance monitoring data associated with software applications executing on the processing units. The administrative user of the data center may want to gather performance monitoring data for the computing system as a whole. The administrative user may also want to gather performance monitoring data for each individual virtual machine executing on the computing system. The administrative user can use this performance monitoring data to determine how the computing systems are being used, whether the computing systems are deployed with appropriate memory and other hardware, whether software applications could be using the hardware more efficiently, and/or the like. Each guest user may want to gather performance monitoring data for the virtual machines assigned to the guest user in order to determine how to use the hardware resources of the assigned virtual machines more efficiently. Further, each virtual machine may time slice computing resources among multiple processes, also referred to as contexts, where one context executes for a first period of time, then another context executes for a second period of time, and so on. The guest user may want to gather performance monitoring data for each individual context to determine which contexts of a virtual machine are executing more efficiently and which contexts are executing less efficiently. To achieve these goals, the performance monitoring data for the computing system as a whole, for each virtual machine, and for each context executing in each virtual machine should be generated concurrently.

Traditionally, certain processing units in a computing system support profiling circuitry that generates certain types of performance data that is useful for software engineers when developing, debugging, and optimizing a software application prior to release. The software engineer employs the profiling circuitry while the software application being profiled is executing. Typically, the software engineer employs the profiling circuitry for a brief period of time or repeatedly in a loop of a small portion of the software application. While profiling circuitry generates certain types of performance data, this profiling circuitry is not well suited to the performance monitoring described above for various reasons. First, profiling circuitry is designed to generate profiling data for a particular software application for short periods of time. Such profiling circuitry is unable to generate performance monitoring data across all contexts executing across all virtual machines on a computing system without impacting software application behavior. Second, profiling circuitry is not well suited to monitoring large numbers of metrics at a single time or across a long period of time in a power efficient manner. Expanding existing profiling circuitry to generate performance monitoring data as described above can result in large amounts of power consumption and computing resources to be devoted to generating performance monitoring data. Third, profiling circuitry is optimized to execute intermittently for short duration execution, to execute in a loop, etc. and is not well suited for continuous operation. Fourth, if profiling circuitry is employed for generating performance monitoring data, then the profiling circuitry is not concurrently available for profiling software being tested, which is the main application for profiling circuitry.

As the foregoing illustrates, what is needed in the art are more effective techniques for securely generating performance monitoring data in a computing system.

SUMMARY

Various embodiments of the present disclosure set forth a computer-implemented method for generating performance monitoring data. The method includes receiving an electronic signal representing a first performance metric. The method further includes incrementing a first counter associated with the performance metric during each clock cycle in which the electronic signal is at a first state. The method further includes serializing a value stored in the first counter to generate a serialized value. The method further includes transmitting the serialized value to a via one or more electronic signal paths.

Other embodiments include, without limitation, a system that implements one or more aspects of the disclosed techniques, and one or more computer readable media including instructions for performing one or more aspects of the disclosed techniques, as well as a method for performing one or more aspects of the disclosed techniques.

At least one technical advantage of the disclosed techniques relative to the prior art is that, with the disclosed techniques, the performance monitoring subsystem securely and continuously generates performance monitoring data for all virtual machines executing on the computing system and for all contexts executing on those virtual machines. Further, the performance monitoring subsystem is structured to distribute the performance monitoring data with an efficient architecture that is more power efficient relative to profiling circuitry designed for developing, debugging, and optimizing a single software application. Further, the performance monitoring subsystem operates independently from profiling circuitry. As a result, performance monitoring and profiling circuitry can be employed simultaneously. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
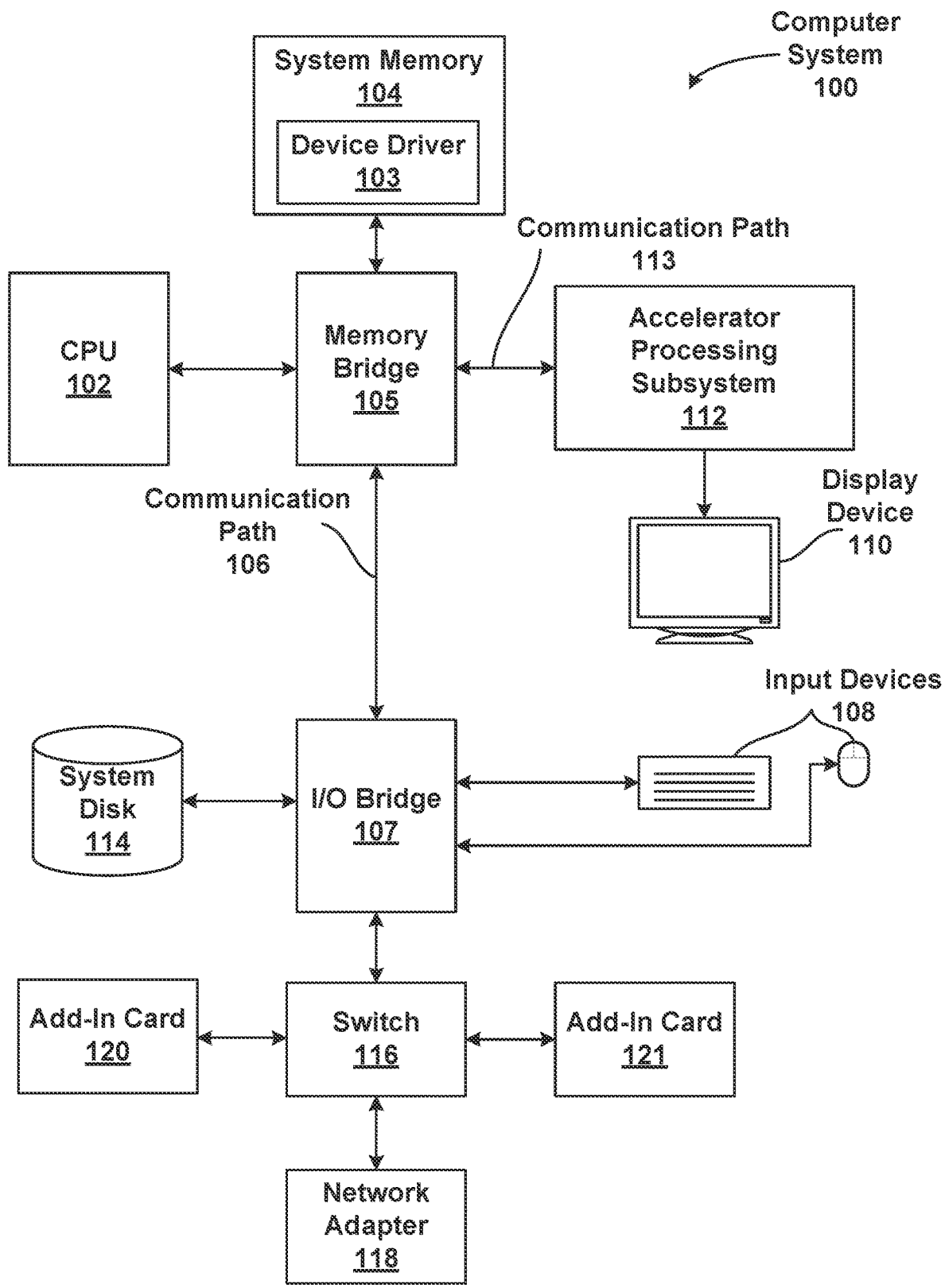
FIG. 1 is a block diagram of a computer system configured to implement one or more aspects of the various embodiments.

FIG. 1 is a block diagram of a computer system 100 configured to implement one or more aspects of the various embodiments. As shown, computer system 100 includes, without limitation, a central processing unit (CPU) 102 and a system memory 104 coupled to an accelerator processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. In some examples, input devices 108 are employed to verify the identities of one or more users in order to permit access of computer system 100 to authorized users and deny access of computer system 100 to unauthorized users. Switch 116 is configured to provide connections between I/O bridge 107 and other components of the computer system 100, such as a network adapter 118 and various add-in cards 120 and 121. In some examples, network adapter 118 serves as the primary or exclusive input device to receive input data for processing via the disclosed techniques.

As also shown, I/O bridge 107 is coupled to a system disk 114 that may be configured to store content and applications and data for use by CPU 102 and accelerator processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, Peripheral Component Interconnect Express (PCIe), HyperTransport, or any other bus or point-to-point communication protocol known in the art.

In some embodiments, accelerator processing subsystem 112 comprises a graphics subsystem that delivers pixels to a display device 110 that may be any conventional cathode ray tube, liquid crystal display, light-emitting diode display, or the like. In such embodiments, the accelerator processing subsystem 112 incorporates circuitry optimized for graphics and video processing, including, for example, video output circuitry. As described in greater detail below in FIG. 2, such circuitry may be incorporated across one or more accelerators included within accelerator processing subsystem 112. An accelerator includes any one or more processing units that can execute instructions such as a central processing unit (CPU), a parallel processing unit (PPU) of FIGS. 2-4, a graphics processing unit (GPU), an intelligence processing unit (IPU), neural processing unit (NAU), tensor processing unit (TPU), neural network processor (NNP), a data processing unit (DPU), a vision processing unit (VPU), an application specific integrated circuit (ASIC), a field-programmable gate array (FPGA), and/or the like.

In some embodiments, accelerator processing subsystem 112 includes two processors, referred to herein as a primary processor (normally a CPU) and a secondary processor. Typically, the primary processor is a CPU and the secondary processor is a GPU. Additionally or alternatively, each of the primary processor and the secondary processor may be any one or more of the types of accelerators disclosed herein, in any technically feasible combination. The secondary processor receives secure commands from the primary processor via a communication path that is not secured. The secondary processor accesses a memory and/or other storage system, such as such as system memory 104, Compute eXpress Link (CXL) memory expanders, memory managed disk storage, on-chip memory, and/or the like. The secondary processor accesses this memory and/or other storage system across an insecure connection. The primary processor and the secondary processor may communicate with one another via a GPU-to-GPU communications channel, such as Nvidia Link (NVLink). Further, the primary processor and the secondary processor may communicate with one another via network adapter 118. In general, the distinction between an insecure communication path and a secure communication path is application dependent. A particular application program generally considers communications within a die or package to be secure. Communications of unencrypted data over a standard communications channel, such as PCIe, are considered to be unsecure.

In some embodiments, the accelerator processing subsystem 112 incorporates circuitry optimized for general purpose and/or compute processing. Again, such circuitry may be incorporated across one or more accelerators included within accelerator processing subsystem 112 that are configured to perform such general purpose and/or compute operations. In yet other embodiments, the one or more accelerators included within accelerator processing subsystem 112 may be configured to perform graphics processing, general purpose processing, and compute processing operations. System memory 104 includes at least one device driver 103 configured to manage the processing operations of the one or more accelerators within accelerator processing subsystem 112.

In various embodiments, accelerator processing subsystem 112 may be integrated with one or more other the other elements of FIG. 1 to form a single system. For example, accelerator processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of accelerator processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, accelerator processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
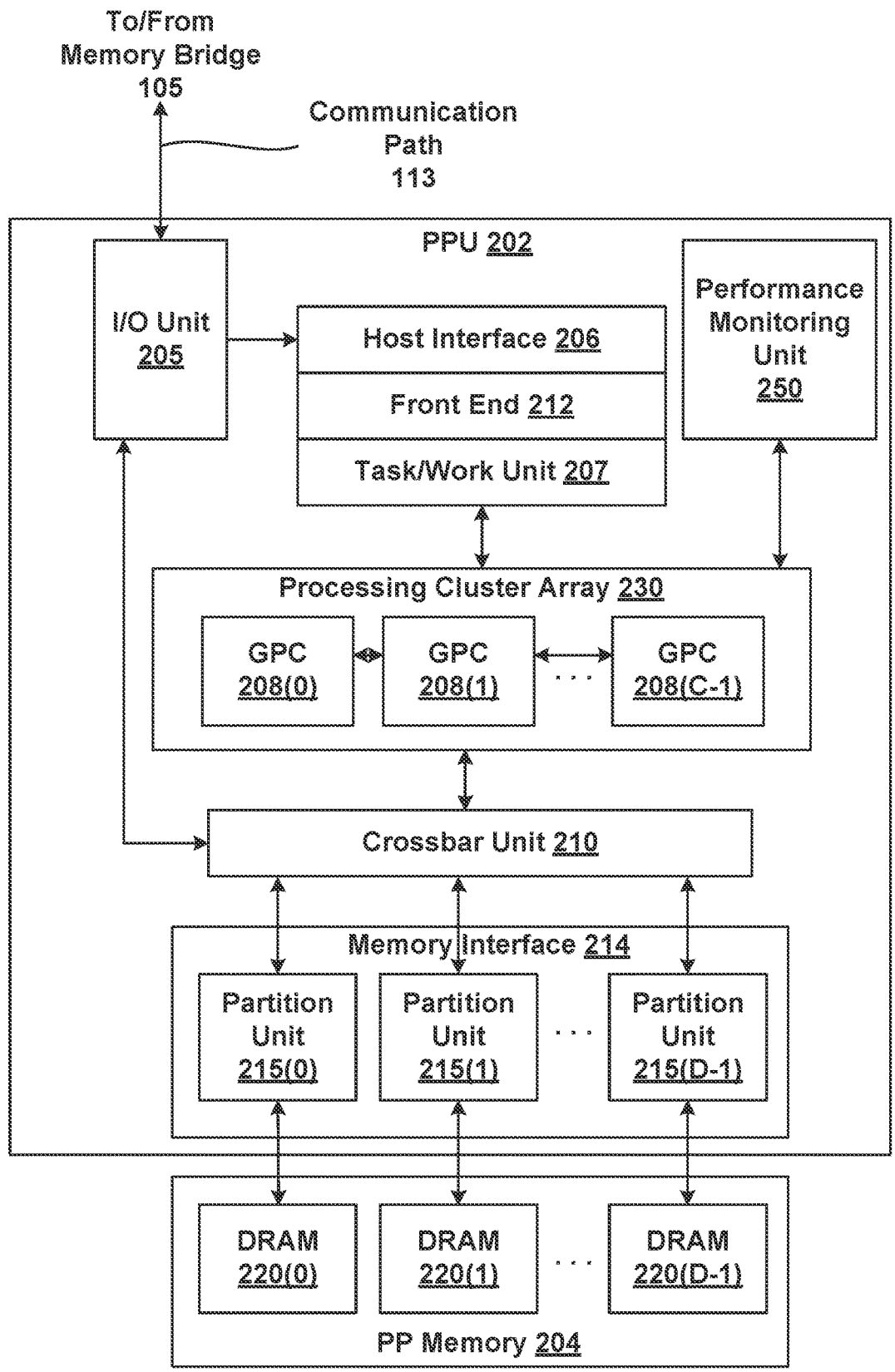
FIG. 2 is a block diagram of a parallel processing unit (PPU) included in the accelerator processing subsystem of FIG. 1, according to various embodiments.

FIG. 2 is a block diagram of a parallel processing unit (PPU) 202 included in the accelerator processing subsystem 112 of FIG. 1, according to various embodiments. Although FIG. 2 depicts one PPU 202, as indicated above, accelerator processing subsystem 112 may include any number of PPUs 202. Further, the PPU 202 of FIG. 2 is one example of an accelerator included in accelerator processing system 112 of FIG. 1. Alternative accelerators include, without limitation, CPUs, GPUs, IPUs, NPUs, TPUs, NNPs, DPUs, VPUs, ASICs, FPGAs, and/or the like. The techniques disclosed in FIGS. 2-4 with respect to PPU 202 apply equally to any type of accelerator(s) included within accelerator processing subsystem 112, in any combination. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. Additionally or alternatively, processors and/or accelerators other than CPU 102 may write one or more streams of commands for PPU 202 to a data structure. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, accelerator processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PP memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity, and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within accelerator processing subsystem 112, or another accelerator processing subsystem 112 within computer system 100.

As noted above, any number of PPUs 202 may be included in an accelerator processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

PPU 202 further includes a performance monitoring subsystem 250. As described herein, performance monitoring subsystem 250 generates performance monitoring data associated with PPU 202, including performance monitoring data for each virtual machine and each context executing on PPU 202.

Figure 3:
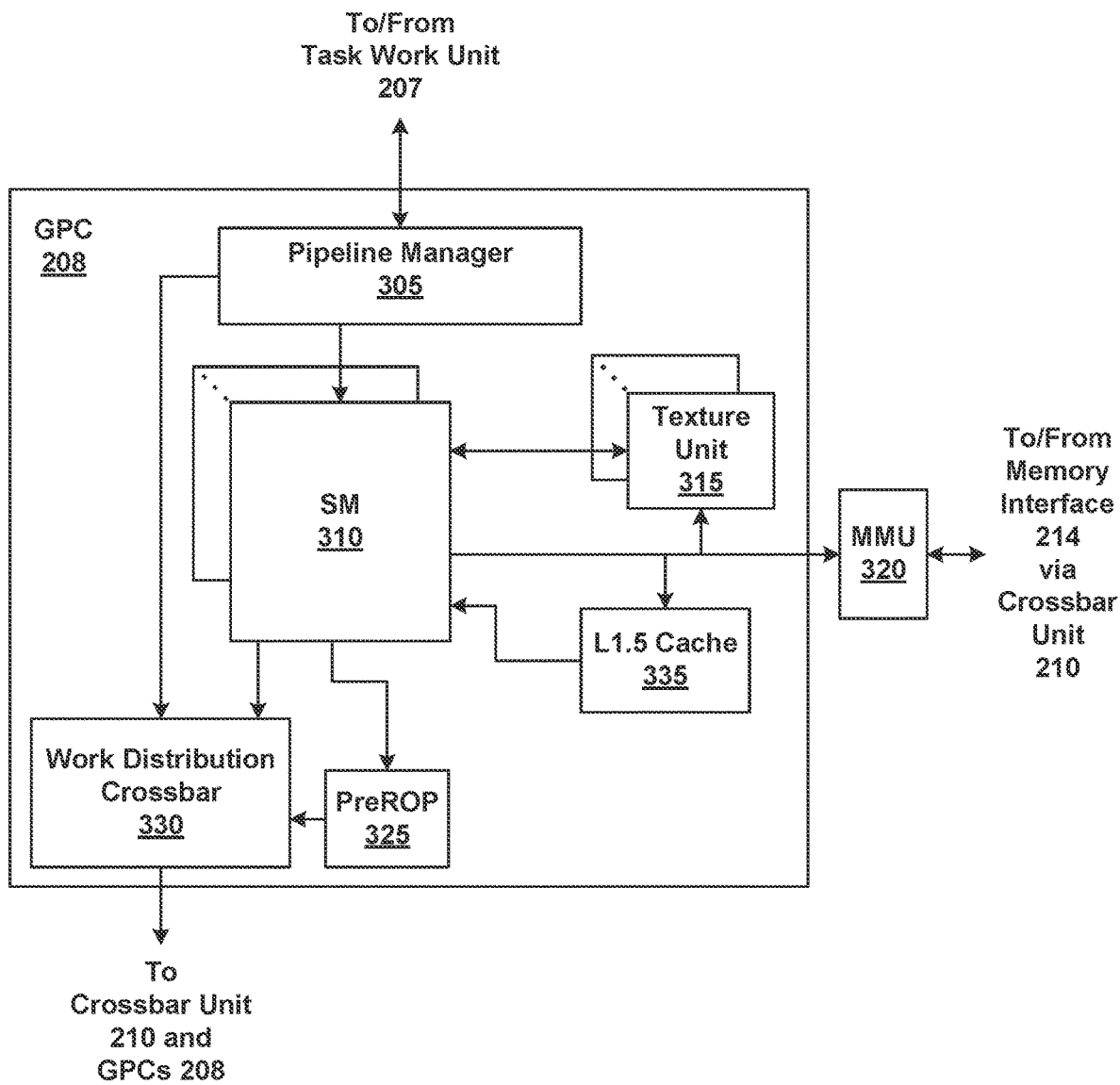
FIG. 3 is a block diagram of a general processing cluster (GPC) included in the parallel processing unit (PPU) of FIG. 2, according to various embodiments.

FIG. 3 is a block diagram of a general processing cluster (GPC) 208 included in the parallel processing unit (PPU) 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M 1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (e.g., AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In various embodiments, a software application written in the compute unified device architecture (CUDA) programming language describes the behavior and operation of threads executing on GPC 208, including any of the above-described behaviors and operations. A given processing task may be specified in a CUDA program such that the SM 310 may be configured to perform and/or manage general-purpose compute operations.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the various embodiments of the present disclosure.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Generating Power Efficient Secure Multiclient Performance Monitoring Data

Various embodiments include techniques for generating power efficient secure multiclient performance monitoring data of a processing unit in a computing system. The computing system includes a performance monitoring subsystem that includes a unit level counter with a set of counters, where each counter increments during each clock cycle in which a corresponding electronic signal is at a first state, such as a high or low logic level state. Periodically, the unit level counter transmits the counter values to a corresponding counter collection unit. The counter collection unit includes a set of counters that aggregates the values of the counters in multiple unit level counters. Based on certain trigger conditions, the counter collection unit transmits records to a reduction channel. The reduction channel includes a set of counters that aggregates the values of the counters in multiple counter collection units. Each virtual machine executing on the system can access a different corresponding reduction channel, providing secure performance metric data for each virtual machine.

The disclosed techniques perform both in band monitoring and out of band monitoring. In band monitoring is performed by executing a client software application on the CPU 102 via an operating system that actively communicates with the PPU 202 to generate performance monitoring data. This client software application can access the performance monitoring data via another software application executing on the PPU 202. Such in band monitoring can reduce the compute resources available to the hypervisor and/or to one or more virtual machines executing on the computer system 100. Computing resources consumed by in band monitoring represents computing resources that are unavailable for other purposes, such as executing client software applications. Because data centers, cloud service providers, and other large deployments lease computing resources to various guest users, out of band monitoring is often preferred over in band monitoring.

Out of band monitoring is performed outside of the normal operation of the CPU 102, including operating systems and/or the hypervisor executing on the CPU 102. Out of band monitoring avoids using any of the resources being leased out to guest users. A separate secure microcontroller in the computer system 100 configures components included in a performance monitoring subsystem 250 without consuming resources from components employed for executing customer software applications. Generating performance monitoring data via such a microcontroller does not negatively affect performance of customer applications executing on the CPU 102 and/or PPUs 202. The microcontroller executes with a high privilege level, thereby giving high level of visibility and accessibility to the generated performance monitoring data. The microcontroller operates in a secure environment and validates requests from both the hypervisor and the virtual machines executing via the hypervisor. As a result, neither the hypervisor nor the virtual machines are able to negatively impact out of band monitoring performed by the performance monitoring subsystem 250.

The disclosed techniques can generate secure performance monitoring data for both out of band monitoring clients and in band monitoring clients. For example, the disclosed techniques can generate secure performance monitoring data for multiple virtual machines sharing the same computer system 100. Additionally or alternatively, the disclosed techniques can generate secure performance monitoring data for multiple virtual machines and concurrently generate secure performance monitoring data for individual contexts executing on those virtual machines. The performance monitoring data is secure in that one virtual machine cannot access performance monitoring data of another virtual machine, one context cannot access performance monitoring data of another context, and/or the like.

Figure 4:
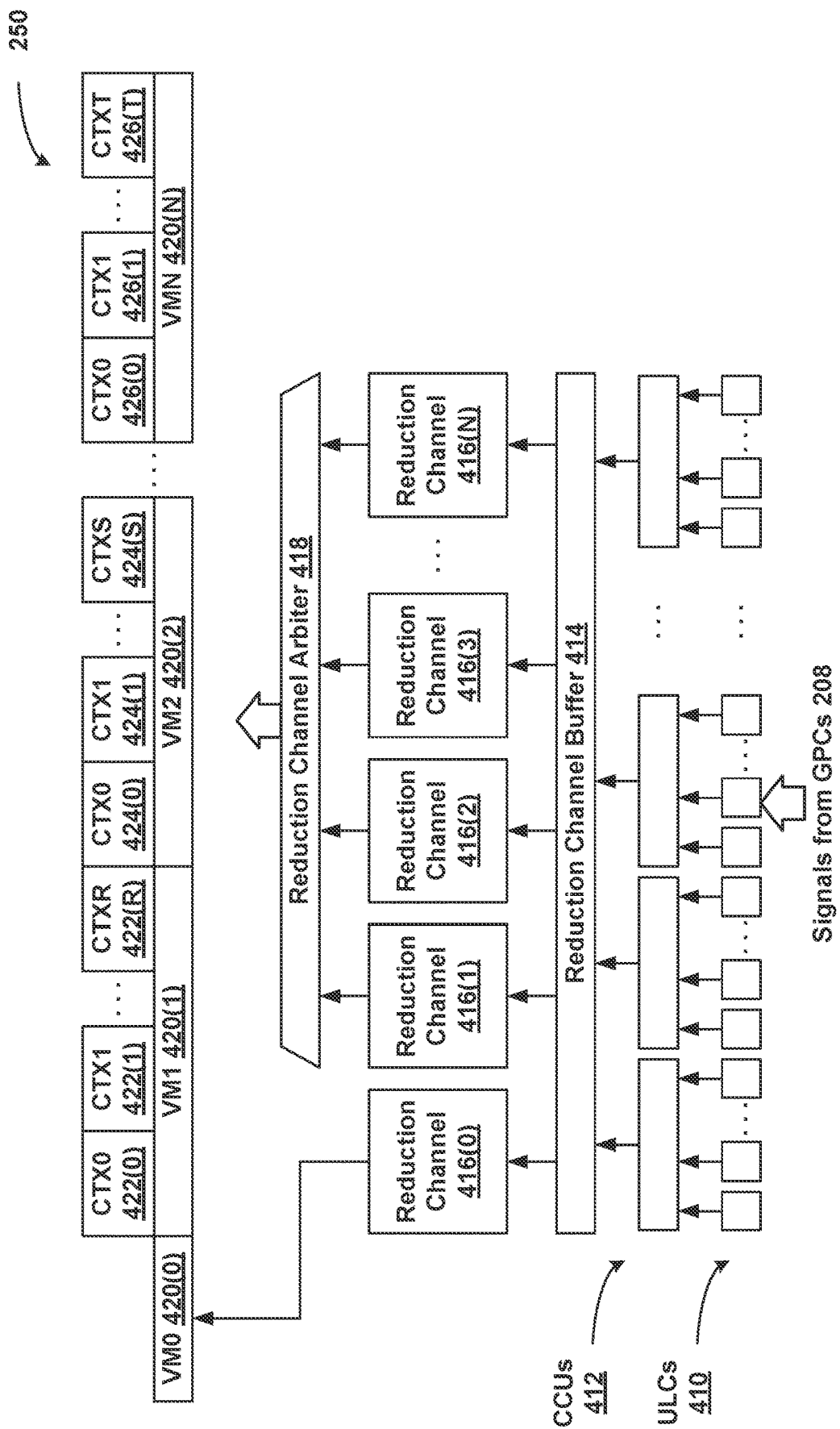
FIG. 4 is a block diagram of the performance monitoring subsystem included in the PPU of FIG. 2, according to various embodiments.

FIG. 4 is a block diagram of the performance monitoring subsystem 250 included in the PPU of FIG. 2, according to various embodiments. As shown, the performance monitoring subsystem 250 includes, without limitation, unit level counters (ULCs) 410, counter collection units (CCUs) 412, a reduction channel buffer 414, reduction channels 416(0)-416(N), and a reduction channel arbiter 418.

Each unit level counter 410 collects count values associated with basic performance events, such as electronic signals, generated by components of GPCs 208 in proximity to the unit level counter 410. Additionally or alternatively, unit level counters 410 can collect count values associated with performance events generated by components external to the GPCs 208 including L2 cache memories, memory controllers, communications channels such as NVLink and/or PCIe, and/or the like. In some examples, unit level counter 410 counts occurrences of single bit events. One such event is an electronic signal being at a particular state, such as a high logic level state or a low logic level state. The unit level counter 410 can increment a counter during each clock cycle in which the electronic signal is at a particular state. The electronic signal can represent any technically feasible performance metric, such as execution of an instruction by a GPC 208, usage of a specified component included in the GPC 208, occurrence of a cache miss in a cache memory, occurrence of a cache hit in the cache memory, and/or the like. Additionally or alternatively, unit level counter 410 counts occurrences of multiple bit events.

Additionally or alternatively, unit level counter 410 encodes multiple bit events into a single bit that represents an event. For example, a multiple bit event can be the number of threads in a warp that execute an instruction in a given clock cycle. The unit level counter 410 can include a six-bit counter that adds the number of threads in a warp that execute an instruction in a current clock cycle to the value currently stored in the counter. The unit level counter 410 can increment a single bit counter for each clock cycle in which the most significant bit of the six-bit counter has a value of one. In this manner, the single bit counter represents the number of threads in a warp that execute an instruction modulo 32.

Periodically, the unit level counters 410 sample or snapshot the current values in the various counters and transmit the values to a shared serializer. The serializer, in turn, transmits the values over a serial interface bus to a corresponding counter collection unit 412. The serial interface bus may have a single signal path for transmitting the values or may have multiple signal paths. After each snapshot, the unit level counters clear 410 the count value to an initial value and start to count events for the next period. The unit level counters 410 can include any technically feasible number of counters of any bit width. In general, the bit width of the unit level counters 410 dictates the maximum period between samples or snapshots of the current values in the various counters. In some examples, a unit level counter can include up to 45 counters, where each counter is up to 9 bits. In such examples, the unit level counters can transmit values periodically after a duration of time of $2^9-1$, or 511 clock cycles.

In addition to the serial interface bus to transmit values to the counter collection unit 412, the unit level counter 410 receives an enable signal from the counter collection unit 412. Although each unit level counter 410 transmits counter values over a point-to-point serial interface bus, a counter collection unit 412 transmits the enable signal to multiple unit level counters 410, such as all of the unit level counters 410 supported by the counter collection unit 412. In some examples, each counter collection unit 412 can support up to 48 unit level counters 410. In general, a counter collection unit 412 is centrally located with respect to the unit level counters 410 supported by the counter collection unit 412. When the unit level counter 410 receives the enable signal from the counter collection unit 412, the unit level counter 410 begins continuously counting events and periodically transmitting the counter values to the counter collection unit 412, along with start and/or end signals to indicate the beginning or the end, respectively, of a set of counter values.

Each counter collection unit 412 receives counter values from multiple unit level counters 410. As the counter collection unit 412 receives a set of counter values, the counter collection unit 412 deserializes the set of counter values and adds the counter values to counters within the counter collection unit 412. More particularly, the counter collection unit 412 collects and stores the values for that unit level counter 410 in a set of counters stored within a memory of the counter collection unit 412. More particularly, the counter collection unit 412 adds the values received from the unit level counters 410 to the values in corresponding counters within the counter collection unit 412. Generally, the counters within the counter collection unit 412 are wider than the counters within the unit level counters 410. In some examples, the counters within the counter collection unit 412 are 28 bits wide. As a result, the counter collection unit 412 can accumulate and aggregate event counts for a longer period of time than the unit level counters 410. Accordingly, the counter collection unit 412 consumes fewer registers for storing the deserialized counter values. Therefore, in some examples, the counter collection unit 412 can employ a memory device that only allows a subset of counters to be written at any given time.

In some examples, the counter collection unit 412 can mask certain counter values received from the unit level counters 410, such as when a performance monitoring operation samples a subset of the available event data from the unit level counters 410. Counter values from the unit level counters 410 that are masked are not added to the corresponding counters within the counter collection unit 412 without overflowing.

Upon receiving a trigger signal, the counter collection unit 412 samples or snapshots the current values in the various counters and generates a set of records that includes the counter values. In some examples, each record includes values for eight counters in the counter collection unit 412. The counter collection unit 412 transmits the records via a reduction channel buffer 414 to a corresponding reduction channel 416 that aggregates counter values for multiple counter collection units 412. After each snapshot, the counter collection unit 412 clears count values to an initial value and starts to count events until the next trigger condition is received. The trigger condition can be a write operation directed to a particular register in the counter collection unit 412, an external trigger signal transmitted to the counter collection unit 412, a counter in the counter collection unit 412 reaching a threshold value, and/or the like. A hardware module referred to herein as a trigger block (not shown in FIG. 4) transmits the trigger signal to the counter collection units 412 at regular intervals with a programmable period. The trigger block instructs the counter collection units 412 to transmit records for all counters in the counter collection units 412, clear the counters, and switch to the currently idle memory banks in the counter collection units 412 for further accumulation of count values.

The counter collection unit 412 stores two sets of counter values, where each set of counter values is stored in a different memory bank. At any point in time, the counter collection unit 412 aggregates counter values in one memory bank, referred to as the active memory bank, while the other memory bank is idle. Upon detecting a trigger condition, the counter collection unit 412 switches the memory banks such that the active memory bank is now idle and the idle memory bank is now active. The counter collection unit 412 generates records based on counter values stored in the now idle memory bank and transmits the records to the reduction channel 416 over an on-chip network via the reduction channel buffer 414. After generating the records from the idle memory bank, the counter collection unit 412 clears the counters in the idle memory bank to prepare the idle memory bank for aggregating counter values after the subsequent trigger condition. Concurrently, the counter collection unit 412 aggregates counter values received from the unit level counter 410 to the counters in the now active memory bank.

The reduction channels 416(0)-416(N) receive records from the counter collection units 412 and aggregate the counter values included in the records into a set of counters within the respective reduction channels 416. In some examples, the counters within the reduction channels 416 are 64 bits wide. As a result, the reduction channels 416 can accumulate and aggregate event counts for a longer period of time than the counter collection unit 412. Records received from the counter collection units 412 are buffered in the reduction channel buffer 414. The reduction channel buffer 414 routes each record to the appropriate reduction channel 416.

Reduction channel 416(0) is assigned to the hypervisor. The PPU 202 can partition execution units and other resources into multiple partitions that can be used separately as independent, partial GPUs (referred to as GPU slices). Therefore, in addition to reduction channel 416(0) for system wide monitoring, each GPU slice corresponds to one of N reduction channels 416(1)-416(N). Reduction channel 416(0) monitors all records routed by the reduction channel buffer 414 to the other reduction channels 416(1)-416(N). Because the hypervisor analyzes performance monitoring data system wide, reduction channel 416(0) receives and aggregates performance monitoring data received by reduction channels 416(1)-416(N). Reduction channel 416(0) stores counter values and related performance monitoring data in memory block VM0 420(0).

Each of reduction channels 416(1)-416(N) receives records that correspond to resources assigned to the corresponding GPU slice. These reduction channels 416(1)-416(N) do not receive records that correspond to resources assigned to the other GPU slices. Therefore, the performance monitoring data received by reduction channels 416(1)-416(N) is secure and accessible only to the client that is assigned to the corresponding GPU slices.

The reduction channels 416(0)-416(N) receive data from multiple counter collection units 412, where the multiple counter collection units 412 can monitor different instances of the same type. For example, a first counter collection unit 412 assigned to reduction channel 416(1) can monitor a first set of SMs 310, a first L2 cache memory, and/or the like. A second counter collection unit 412 assigned to the same reduction channel 416(1) can monitor a second set of SMs 310, a second L2 cache memory, and/or the like. Reduction channel 416(1) can aggregate counter values across the first counter collection unit 412, the second counter collection unit 412, and/or additional counter collection units 412. As a result, reduction channel 416(1) can maintain a single set of counter values that aggregate performance monitoring data for all SMs assigned to the corresponding GPU slice. Similarly, reduction channel 416(1) can maintain a single set of counter values that aggregate performance monitoring data for all L2 cache memories assigned to the corresponding GPU slice, and so on.

Reduction channels 416(1)-416(N) perform one or more atomic add operations to add counter values and related performance monitoring data to the current values stored in memory based on the virtual machines and contexts executing on the corresponding GPU slices. The reduction channel arbiter 418 routes counter values and related performance monitoring data from the reduction channels 416(1)-416(N) to the memory stores for the corresponding virtual machines and contexts. Subsequent to performing the atomic add operations, the reduction channels 416(1)-416(N) can reset the corresponding counters within the reduction channels 416(1)-416(N). In this manner, the reduction channels 416(1)-416(N) do not need to store a virtual machine level copy a context level copy of the counters within the reduction channels 416(1)-416(N). Further, when a context switch occurs, the reduction channels 416(1)-416(N) do not need to restore counter values within the reduction channels 416(1)-416(N) to the values for the incoming context. Instead, during a context switch, the reduction channels 416(1)-416(N) can simply issue atomic adds to the appropriate counter values in memory and reset the counters within the reduction channels 416(1)-416(N).

For example, reduction channel 416(1) can be generating performance monitoring data for virtual machine VM2, reduction channel 416(2) can be generating performance monitoring data for virtual machine VMN, and reduction channel 416(3) can be generating performance monitoring data for virtual machine VM1. In this example, when reduction channel 416(1) generates performance monitoring data for VM2, reduction channel 416(1) stores the performance monitoring data in memory block VM2 420(2). Similarly, when reduction channel 416(2) generates performance monitoring data for VMN, reduction channel 416(2) stores the performance monitoring data in memory block VMN 420(N). Likewise, when reduction channel 416(3) generates performance monitoring data for VM1, reduction channel 416(3) stores the performance monitoring data in memory block VM1 420(1).

Further, reduction channels 416(1)-416(N) can perform context level performance monitoring. Context switching allow multiple applications to execute serially and share the same physical hardware resources over time. Within a virtual machine that is associated with a particular GPU slice, contexts are able to time slice the resources of the virtual machine. Reduction channels 416(1)-416(N) perform virtual machine level monitoring by storing data in the appropriate virtual machine memory blocks 420(1)-420(N). Similarly, reduction channels 416(1)-416(N) perform context level monitoring by storing data in the appropriate context memory blocks 422(0)-422(R), 424(0)-424(S), and 426(0)-426(T). When a new context switches in for a given virtual machine, the corresponding reduction channel 416 continues to store performance monitoring data in the same virtual machine memory block. However, the corresponding reduction channel 416 stops storing performance monitoring data in the context memory block for the context being switched out. Instead, the corresponding reduction channel 416 begins storing performance monitoring data in the context memory block for the context being switched in.

In the above example, when reduction channel 416(1) generates performance monitoring data for VM2, reduction channel 416(1) stores the performance monitoring data in memory block VM2 420(2). In addition, reduction channel 416(1) cycles among storing the performance monitoring data in memory blocks CTX0 424(0)-CTXS 424(S), based on which context is currently executing on VM2. Similarly, when reduction channel 416(2) generates performance monitoring data for VMN, reduction channel 416(2) stores the performance monitoring data in memory block VMN 420(N). In addition, reduction channel 416(2) cycles among storing the performance monitoring data in memory blocks CTX0 426(0)-CTXT 426(T), based on which context is currently executing on VMN. Likewise, when reduction channel 416(3) generates performance monitoring data for VM1, reduction channel 416(3) stores the performance monitoring data in memory block VM1 420(1). In addition, reduction channel 416(3) cycles among storing the performance monitoring data in memory blocks CTX0 422(0)-CTXR 422(R), based on which context is currently executing on VM1.

In some examples, the PPU 202 performs additional steps during a context switch to ensure data integrity and security of the performance monitoring data. During a context switch, the PPU 202 pauses the currently executing context. The PPU 202 pauses triggers from being transmitted by the counter collection units 412 and the unit level counters 410. The PPU 202 pauses triggers from being transmitted by the trigger blocks to the counter collection units. The PPU 202 performs a write operation to a trigger block register to cause the trigger block to issue a trigger condition to the counter collection units 412. The trigger block instructs the counter collection units 412 to transmit records for all counters in the counter collection units 412, clear the counters, and switch to the currently idle memory banks in the counter collection units 412 for further accumulation of count values. The counter collection units 412 disable the unit level counters 410 from periodically transmitting counter values to the counter collection units 412, thereby preventing periodic transmissions during the context switch. As a result, the unit level counters 410 generate only the counter values associated with the trigger block associated with the context switch.

The PPU 202 performs a write operation to a trigger block register to cause the trigger block to transmit a flush request. The flush request propagates through the performance monitoring subsystem 250 to ensure that all counter collection units 412 have processed the trigger block and have responded by sending out the relevant records. Without such a flush request, the performance monitoring subsystem 250 may not be able to ensure that all records generated prior to the flush have arrived at the reduction channels 416 as is required before a context switch.

After receiving the flush request, each counter collection unit 412 transmits the records associated with the flush request and then transmits a record without valid data, which is interpreted by the trigger block as a flush acknowledgement. This flush acknowledgement indicates that all data from all previous triggers from that counter collection unit 412 have already been sent. Therefore, the trigger block can update its status to indicate that all counter data for the context being switched out has arrived at the appropriate reduction channel. This reduction channel 416 subsequently issues atomic adds to commit its current counter values to memory. The reduction channel 416 is updated to point to the context memory block for the switched in context. The MMU 320 rebinds to the address space of the switched in context, so that the MMU 320 properly translates virtual addresses for the new context.

The PPU 202 polls a trigger block register to determine when all of the flush acknowledgements have been received from all the counter collection units 412 assigned to that trigger block. The PPU 202 loads the new incoming context. The PPU 202 updates the state of the reduction channel 416 for the new context. The PPU 202 unpauses the periodic triggers of the trigger block to the counter collection units 412. The PPU 202 unpauses the periodic triggers of the counter collection units 412 to the unit level counters 410. The PPU 202 unpauses the newly loaded context, and the newly loaded context begins executing.

During a context switch, the PPU 202 work halts, and the state of the PPU 202 associated with the context switching out is saved to memory. The state of the PPU 202 associated with the context switching in is restored from memory. In general, performance monitoring data for these context switching activities is not needed. Therefore, after the PPU 202 halts, the performance monitoring subsystem 250 flushes out and saves to memory the performance monitoring data for the context switching out.

The context store and restore for the PPU 202 proceeds without generating performance monitoring data. The performance monitoring subsystem 250 clears the counters in the unit level counters 410 and the counter collection units 412. The context switching in resumes execution with the performance monitoring subsystem 250 ready to generate performance monitoring data for the new context. The context switch completes, and the performance monitoring subsystem 250 enables periodic transmissions so that the new performance monitoring data is for the new context. Counter memory blocks for the switched out context can be read, but these memory blocks are not written until the switched out context is switched back in at a later time.

In some examples, multiple components can access the performance monitoring data stored in the virtual machine memory blocks and the context memory blocks. For example, the microcontroller in the performance monitoring subsystem 250, the reduction channels 416(0)-416(N), and possibly other components can access the virtual machine memory blocks and the context memory blocks.

In some examples, one or more GPU slices can time slice among multiple virtual machines. In such examples, the corresponding reduction channels 416(1)-416(N) perform time sliced virtual machine level monitoring by storing data in the appropriate virtual machine memory blocks in a manner similar to that of context level machine monitoring. When a new virtual machine switches in, the corresponding reduction channel 416 stops generating and storing performance monitoring data in the virtual machine memory block for the virtual machine being switched out. Instead, the corresponding reduction channel 416 begins generating and storing performance monitoring data in the virtual machine memory block for the virtual machine being switched in.

In some examples, the performance monitoring subsystem 250 is compatible with a confidential computing environment, where data accessible to the CPU 102 is encrypted. While performance monitoring data is stored in the PPU 202, such as in the various components of the performance monitoring subsystem 250, the data can be unencrypted. When the performance monitoring subsystem 250 transmits performance monitoring data to the CPU 102, the performance monitoring data is encrypted. As described herein, performing monitoring data is in the form of counter values of the counter collection units 412 and reduction channels 416. These counter values are stored in memory. To encrypt these counter values, a copy engine, also referred to a direct memory access controller, included in the PPU 202 performs a copy operation. During the copy operation, the copy engine retrieves the counter values of the counter collection units 412 and/or reduction channels 416 from memory. The copy engine encrypts the counter values and stores the encrypted counter values into a memory that is accessible by the CPU 102.

As a result, the performance monitoring data can be exposed as an encrypted data record to a trusted execution environment. Therefore, per context and/or per virtual machine performance monitoring data would not be visible to the hypervisor or to virtual machines that are not within the trusted execution environment. Only the virtual machines that are in the trusted execution environment can decrypt the performance monitoring data. Therefore, an advantage of storing performance monitoring data in memory is that the confidential computing infrastructure secures various portions of memory. As a result, the performance monitoring data in memory is naturally securable in a confidential computing environment.

In some examples, multiple reduction channels 416 can be updated from one counter collection unit 412. In one particular example, a counter collection unit 412 can update a virtual machine level reduction channel 416 as well as a device level reduction channel 416. A secure processor, such as a microcontroller that operates in a secure environment, can read the virtual machine memory blocks 420 and/or the context memory blocks 422 associated with the device level reduction channel 416 or the out of band reduction channel 416. The secure processor can read the virtual machine memory blocks 420 and/or the context memory blocks 422 over an appropriate interconnects, such as the SMBus post box interface (SMBPBI) without the need to allocated any memory. This technique can be useful for an out of band memory client in order to determine how often the PPU 202 is idle and not executing workload, when the driver is unloaded, and/or the like.

In some examples, each unit level counter 410 is designated as either shared among multiple processing engines or partitioned to a particular processing engine. Some units in the PPU 202 are used by multiple processing engines, such as the PCIe communications channel. Such units are associated with multiple unit level counters 410 designed with per context filtering. Additionally or alternatively, such units are associated with a device level unit level counter 410 that reports performance monitoring data at the device level.

Figure 5:
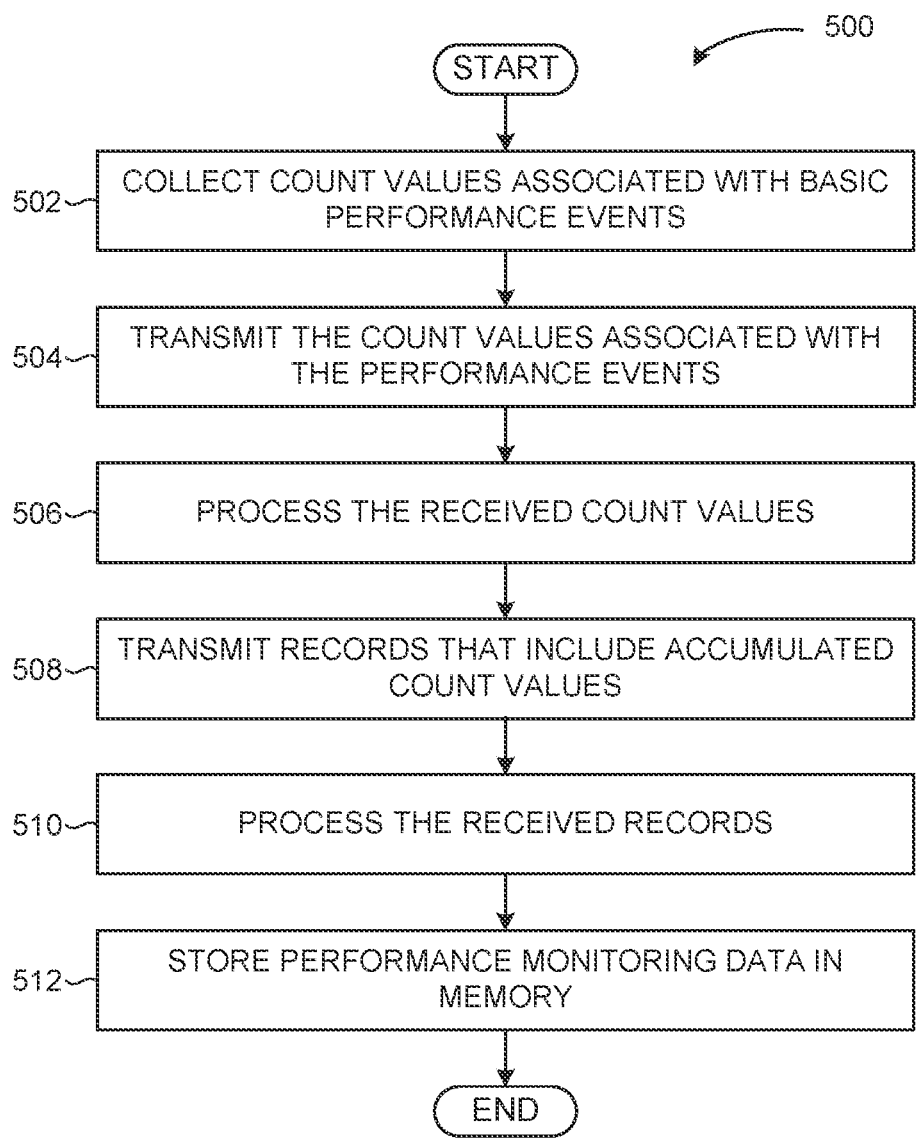
FIG. 5 is a flow diagram of method steps for generating performance monitoring data for a processing unit, such as the PPU of FIG. 2, according to various embodiments.

FIG. 5 is a flow diagram of method steps for generating performance monitoring data for a processing unit, such as the PPU 202 of FIG. 2, according to various embodiments. Additionally or alternatively, the method steps may be performed by one or more alternative accelerators including, without limitation, CPUs, GPUs, IPUs, NPUs, TPUs, NNPs, DPUs, VPUs, ASICs, FPGAs, and/or the like, in any combination. Although the method steps are described in conjunction with the systems of FIGS. 1-4, persons of ordinary skill in the art will understand that any system configured to perform the method steps, in any order, is within the scope of the present disclosure.

As shown, a method 500 begins at step 502, where a unit level counter 410 collects count values associated with basic performance events, such as electronic signals, generated by components of GPCs 208 in proximity to the unit level counter 410. In some examples, the unit level counter 410 counts occurrences of single bit events. One such event is an electronic signal being at a particular state, such as a high logic level state or a low logic level state. The unit level counter 410 can increment a counter during each clock cycle in which the electronic signal is at a particular state. The electronic signal can represent any technically feasible performance metric, such as execution of an instruction by a GPC 208, usage of a specified component included in the GPC 208, occurrence of a cache miss in a cache memory, occurrence of a cache hit in the cache memory, and/or the like. Additionally or alternatively, counts occurrences of multiple bit events, converts multiple bit events into a single bit, and/or the like.

At step 504, the unit level counter 410 transmits the count values associated with basic performance events. Periodically, the unit level counter 410 samples or snapshots the current values in the various counters and transmits the values to a shared serializer. The serializer, in turn, transmits the values over a serial interface bus to a corresponding counter collection unit 412. The serial interface bus may have a single signal path for transmitting the values or may have multiples signal paths. After each snapshot, the unit level counters clear 410 the count value to an initial value and start to count events for the next period. The unit level counters may include any technically feasible number of counters of any bit width. In some examples, a unit level counter can include up to 45 counters, where each counter is up to 9 bits. In such examples, the unit level counters can transmit values periodically after a duration of time of $2^9-1$, or 511 clock cycles.

At step 506, a counter collection unit 412 processes the received count values. The counter collection unit 412 receives counter values from multiple unit level counters 410. When the counter collection unit 412 receives a set of counter values and then receives a signal indicating the end of a set of counter values, the counter collection unit 412 deserializes the set of counter values. The counter collection unit 412 collects and stores the values for that unit level counter 410 in a set of counters stored within a memory of the counter collection unit 412. More particularly, the counter collection unit 412 adds the values received from the unit level counters 410 to the values in corresponding counters within the counter collection unit 412. Generally, the counters within the counter collection unit 412 are wider than the counters within the unit level counters 410. In some examples, the counters within the counter collection unit 412 are 28 bits wide. As a result, the counter collection unit 412 can accumulate and aggregate event counts for a longer period of time than the unit level counters 410.

At step 508, the counter collection unit 412 transmits records that include accumulated count values. Upon receiving a trigger condition, the counter collection unit 412 samples or snapshots the current values in the various counters and generates a set of records that include the counter values. In some examples, each record includes values for eight counters in the counter collection unit 412. The counter collection unit 412 transmits the records via a reduction channel buffer 414 to a corresponding reduction channel 416 that aggregates counter values for multiple counter collection units 412. After each snapshot, the counter collection unit 412 clears count values to an initial value and starts to count events until the next trigger condition is received. The trigger condition can be a write operation directed to a particular register in the counter collection unit 412, an external trigger signal transmitted to the counter collection unit 412, a counter in the counter collection unit 412 reaching a threshold value, and/or the like.

The counter collection unit 412 stores two sets of counter values, where each set of counter values is stored in a different memory bank. At any point in time, the counter collection unit 412 aggregates counter values on one memory bank, referred to as the active memory bank, while the other memory bank is idle. Upon detecting a trigger condition, the counter collection unit 412 switches the memory banks such that the active memory bank is now idle and the idle memory bank is now active. The counter collection unit 412 generates records based on counter values stored in the idle memory bank and transmits the records to the reduction channel 416 over an on-chip network via the reduction channel buffer 414. After generating the records from the idle memory bank, the counter collection unit 412 clears the counters in the idle memory bank to prepare the idle memory bank for aggregating counter values after the subsequent trigger condition. Concurrently, the counter collection unit 412 aggregates counter values received from the unit level counter 410 to the counters in the active memory bank.

At step 510, a reduction channel 416 processes the received records. The reduction channel 416 receives records from the counter collection units 412 and aggregates the counter values in the records into a set of counters associated with the reduction channel 416. In some examples, the counters within the reduction channel 416 are 64 bits wide. As a result, the reduction channel 416 can accumulate and aggregate event counts for a longer period of time than the counter collection unit 412.

At step 512, a reduction channel 416 stores performance monitoring data in memory. Reduction channels 416 store counter values and related performance monitoring data in memory based on the virtual machines and contexts executing on the corresponding GPU slices. For example, reduction channel 416(1) can be generating performance monitoring data for virtual machine VM2, reduction channel 416(2) can be generating performance monitoring data for virtual machine VMN, and reduction channel 416(3) can be generating performance monitoring data for virtual machine VM1. In this example, when reduction channel 416(1) generates performance monitoring data for VM2, reduction channel 416(1) stores the performance monitoring data in memory block VM2 420(2). In addition, reduction channel 416(1) cycles among storing the performance monitoring data in memory blocks CTX0 424(0)-CTXS 424(S), based on which context is currently executing on VM2. Similarly, when reduction channel 416(2) generates performance monitoring data for VMN, reduction channel 416(2) stores the performance monitoring data in memory block VMN 420(N). In addition, reduction channel 416(2) cycles among storing the performance monitoring data in memory blocks CTX0 426(0)-CTXT 426(T), based on which context is currently executing on VMN. Likewise, when reduction channel 416(3) generates performance monitoring data for VM1, reduction channel 416(3) stores the performance monitoring data in memory block VM1 420(1). In addition, reduction channel 416(3) cycles among storing the performance monitoring data in memory blocks CTX0 422(0)-CTXR 422(R), based on which context is currently executing on VM1.

The method 500 then terminates. Alternatively, the method 500 proceeds to step 502 to generate additional performance monitoring data.

In sum, various embodiments include techniques for generating performance monitoring data of a processing unit in a computing system. The computing system includes a performance monitoring subsystem that includes a unit level counter with a set of counters, where each counter increments during each clock cycle in which a corresponding electronic signal is at a first state, such as a high or low logic level state. Periodically, the unit level counter transmits the counter values to a corresponding counter collection unit. The counter collection unit includes a set of counters that aggregates the values of the counters in multiple unit level counters. Based on certain trigger conditions, the counter collection unit transmits records to a reduction channel. The reduction channel includes a set of counters that aggregates the values of the counters in multiple counter collection units. Each virtual machine executing on the system can access a different corresponding reduction channel, providing secure performance metric data for each virtual machine.

At least one technical advantage of the disclosed techniques relative to the prior art is that, with the disclosed techniques, the performance monitoring subsystem securely and continuously generates performance monitoring data for all virtual machines executing on the computing system and for all contexts executing on those virtual machines. Further, the performance monitoring subsystem is structured to distribute the performance monitoring data with an efficient architecture that is more power efficient relative to profiling circuitry designed for developing, debugging, and optimizing a single software application. Further, the performance monitoring subsystem operates independently from profiling circuitry. As a result, performance monitoring and profiling circuitry can be employed simultaneously.

In addition, certain prior approaches involve a software application executing on a CPU that reads counters from registers, ring buffers in CPU accessible memory, or the like, and aggregates the performance monitoring data values in software. The software application reads the counters via polling or interrupt handling techniques. Such prior approaches are typically restricted to aggregating performance monitoring data for a single client. By contrast, the disclosed techniques employ hardware components to collect and aggregate performance monitoring data via a hierarchical aggregation system. The counters increase in bit width at higher levels of the hierarchical aggregation system. As a result, smaller counters are employed at lower levels while larger counters are employed at higher levels of the hierarchical aggregation system, resulting in an efficient use of die area. The hierarchical aggregation system collects, aggregates, and accumulates performance monitoring data via triggered streaming and aggregation hardware components, thereby reducing both CPU overhead and CPU memory accesses. Further, the disclosed hierarchical aggregation system aggregating performance monitoring data for multiple clients, in contrast with prior approaches. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating performance monitoring data, the method comprising:
   receiving an electronic signal representing a performance metric of a processor included in a subset of processors included in a parallel processing system;
   incrementing a first unit level counter associated with the performance metric during each clock cycle in which the electronic signal is at a first state;
   serializing a value stored in the first unit level counter to generate a serialized value; and
   transmitting the serialized value via one or more electronic signal paths, wherein a collection unit comprising a set of counters:
  generates an aggregated counter value of the serialized value stored in the first unit level counter and other counter values,
  stores the aggregated counter value into an active memory bank, and
  upon receiving a trigger condition, switches the active memory bank with an idle memory bank, such that the aggregated counter value is now stored in the idle memory bank.

2. The computer-implemented method of claim 1, further comprising:
  receiving the serialized value;
  deserializing the serialized value to generate a deserialized value; and
  adding the deserialized value to a second counter associated with the performance metric.

3. The computer-implemented method of claim 2, wherein the second counter comprises 28 bits.

4. The computer-implemented method of claim 2, further comprising:
  receiving a trigger;
  generating a record that includes a value stored in the second counter;
  transmitting the record; and
  resetting the first unit level counter to an initial value.

5. The computer-implemented method of claim 4, wherein the second counter comprises 28 bits.

6. The computer-implemented method of claim 4, further comprising:
  receiving the record;
  extracting the value stored in the second counter from the record; and
  adding the value stored in the second counter to a third counter associated with the performance metric.

7. The computer-implemented method of claim 6, wherein the third counter comprises 64 bits.

8. The computer-implemented method of claim 6, wherein the third counter is included in a set of counters associated with a virtual machine and further comprising adding the value stored in the second counter to a fourth counter associated with a device.

9. The computer-implemented method of claim 8, wherein the fourth counter is accessible via a secure processor.

10. The computer-implemented method of claim 6, further comprising storing a value stored in the third counter in a memory that is configured to store performance metrics for a hypervisor associated with the performance metric.

11. The computer-implemented method of claim 6, further comprising storing a value stored in the third counter in a memory that stores performance metrics for a virtual machine associated with the performance metric.

12. The computer-implemented method of claim 6, further comprising storing a value stored in the third counter in a memory that is configured to store performance metrics for a context associated with the performance metric.

13. The computer-implemented method of claim 6, further comprising:
  encrypting a value stored in the third counter to generate an encrypted value; and
  storing the encrypted value in a memory that accessible to a central processing unit associated with the performance metric.

14. The computer-implemented method of claim 1, wherein the electronic signal indicates at least one of:
  execution of an instruction by the processor,
  usage of a specified component included in the processor,
  occurrence of a cache miss in a cache memory, or
  occurrence of a cache hit in the cache memory.

15. The computer-implemented method of claim 1, wherein the electronic signal indicates a logic level state of a most significant bit of a second counter.

16. The computer-implemented method of claim 1, wherein serializing the value stored in the first unit level counter and transmitting the serialized value are performed in response to determining that a duration of time has expired.

17. The computer-implemented method of claim 16, wherein the first unit level counter comprises 9 bits and the duration of time represents 511 clock cycles.

18. The computer-implemented method of claim 16, further comprising, in response to determining that the duration of time has expired, resetting the first unit level counter to an initial value.

19. A system comprising:
  a first set of counters;
  a second set of counters coupled to the first set of counters and configured to:
    receive an electronic signal representing a performance metric of a processor included in a subset of processors included in a parallel processing system,
    increment a first counter included in the second set of counters and associated with the performance metric during each clock cycle that the electronic signal is at a first state,
    serialize a value stored in the first counter to generate a serialized value, and
    transmit the serialized value to a second counter included in the first set of counters via one or more electronic signal paths; and
  a collection unit coupled to the first set of counters and the second set of counters and configured to:
    generate an aggregated counter value of the serialized value stored in the first counter and other counter values,
    store the aggregated counter value into an active memory bank, and
    upon receiving a trigger condition, switch the active memory bank with an idle memory bank, such that the aggregated counter value is now stored in the idle memory bank.

20. The system of claim 19, wherein the collection unit is further configured to:
  receive the serialized value;
  deserialize the serialized value to generate a deserialized value; and
  add the deserialized value to the second counter included in the first set of counters and associated with the performance metric.

* * * * *

UNITED STATES PATENT AND TRADEMARK OFFICE
CERTIFICATE OF CORRECTION

| | | |
|---|---|---|
| PATENT NO. | : 12,468,616 B2 | Page 1 of 1 |
| APPLICATION NO. | : 17/698668 | |
| DATED | : November 11, 2025 | |
| INVENTOR(S) | : Pranav Vaidya et al. | |

It is certified that error appears in the above-identified patent and that said Letters Patent is hereby corrected as shown below:

In the Claims

In Column 24, Line 1, in Claim 13, delete "that accessible" and insert -- that is accessible --.

Signed and Sealed this
Tenth Day of February, 2026

John A. Squires
*Director of the United States Patent and Trademark Office*